(12) United States Patent
Lee

(10) Patent No.: US 6,700,717 B2
(45) Date of Patent: Mar. 2, 2004

(54) SCANNING APPARATUS AND LOCKING DEVICE OF SCANNING APPARATUS

(75) Inventor: Andy Lee, Chungching (CN)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/426,445

(22) Filed: Apr. 29, 2003

(65) Prior Publication Data

US 2004/0012873 A1 Jan. 22, 2004

(30) Foreign Application Priority Data

Jul. 16, 2002 (TW) ...................................... 91210829 U

(51) Int. Cl.[7] .............................................. G02B 26/08
(52) U.S. Cl. ....................... 359/896; 359/196; 74/89.39
(58) Field of Search ................................ 359/196–226, 359/896; 358/474, 494, 497; 74/89.39, 102, 105

(56) References Cited

U.S. PATENT DOCUMENTS 5,973,866 A * 10/1999 Tseng ........................ 359/896
6,247,374 B1 * 6/2001 Tseng ........................ 74/89.22

* cited by examiner

*Primary Examiner*—James Phan
(74) *Attorney, Agent, or Firm*—Baker Botts L.L.P.

(57) ABSTRACT

The present invention provides a locking apparatus for switching between a lock state and an unlock state of a sliding device in a system. The system has a plug and a socket. The sliding device has a shaft. The locking apparatus has a sliding member, a spring, a hook, and a connecting member. The hook has an end part and a bending portion for locking the shaft. When the plug is plugged into the socket, the locking apparatus unlocks the shaft. When the plug is pulled out from the socket, the locking apparatus locks the shaft.

19 Claims, 5 Drawing Sheets

SCANNING APPARATUS AND LOCKING DEVICE OF SCANNING APPARATUS

CROSS REFERENCE TO RELATED APPLICATIONS

This Application claims priority to Taiwan Patent Application No. 091210829 entitled "Scanning Apparatus and Locking Device of Scanning Apparatus", filed Jul. 16, 2002.

FIELD OF INVENTION

The present invention relates to a locking apparatus for switching between a lock state and unlock state of a sliding device, and more particularly, to a locking apparatus of a scanning apparatus.

BACKGROUND OF THE INVENTION

Image processing is important to the storage, management, access, and execution of information. The most used image-catching devices are scanners, which are necessary facilities for scanning pictures, texts, and photos and saving them as graphic files.

Among the inner components of an optical scanner, the carriage is the most important component. The carriage includes many delicate and expensive optical components and can be easily damaged by impacts and shocks. However, when moving the scanner, users usually neglect to prevent the carriage from damage.

In order to avoid damaging the scanner during transportation, a carriage-fixing device has been used to fix the carriage. Before moving the scanner, users have to push or rotate such conventional carriage-fixing device to lock the carriage.

A scanner with this kind of scanning module locking device is disclosed in U.S. Pat. No. 5,973,866, including a housing 12, a scanning module 14, and a locking device 16, as shown in FIG. 1. The locking device 16 includes a protruding member 20, a C-shaped shaft sink 22, an elastic bottom 24, a recess 26, a blocking member 28, and a sliding member 30. The blocking member 28 includes a shaft 32, and a hook 34. The sliding member 30 includes a sliding panel 40 and an elastic arm 44.

As shown in FIG. 2, when the scanning module 14 is positioned at a predetermined position of the housing 12, the sliding member 30 is moved to a locking position. Meanwhile, the elastic arm 44 rotates the blocking member 28 to engage the hook 34 and the C-shaped shaft sink 22. The scanning module 14 is then locked in the scanner. As shown in FIG. 3, when intending to use the scanner, a user moves the sliding member 30 of the sliding panel 40 from a locking position to another position. When the sliding member 30 is moved from the locking position, the elastic arm 44 reversely rotates the blocking member 28 and so the hook 34 separates from the protruding member 20. Then the scanning module 14 is free to horizontally move in the scanner to proceed with the scanning steps.

Although the locking apparatus 16 can lock the scanning module 14, users may still neglect the actuation of the locking apparatus 16 when moving the scanner and accidentally cause damages. Furthermore, the user may forget to unlock the locking apparatus 16 so as to prevent the scanner from working.

Therefore, there exists a need for a locking apparatus without specific actuation steps, to avoid the damage and inconvenience mentioned above.

SUMMARY OF THE INVENTION

In view of the disadvantages of the prior art, the present invention provides a locking apparatus for switching between a lock state and an unlock state of a sliding device in a system. The system has a plug and a socket. The sliding device has a shaft.

The present invention includes a sliding member, a spring, a hook, and a connecting member. The sliding member is movably disposed within the socket and is coupled to the spring. The hook has an end part and a bending portion for locking the shaft. The connecting member is respectively coupled to the sliding member and the end part of the hook. As the plug is plugged into the socket, the locking apparatus unlocks the shaft. As the plug is pulled out from the socket, the locking apparatus locks the shaft.

The present invention, together with objects and advantages thereof, may best be understood by reference to the following detailed description together with the accompanying drawings.

DETAILED DESCRIPTION OF THE INVENTION

Figure 1:
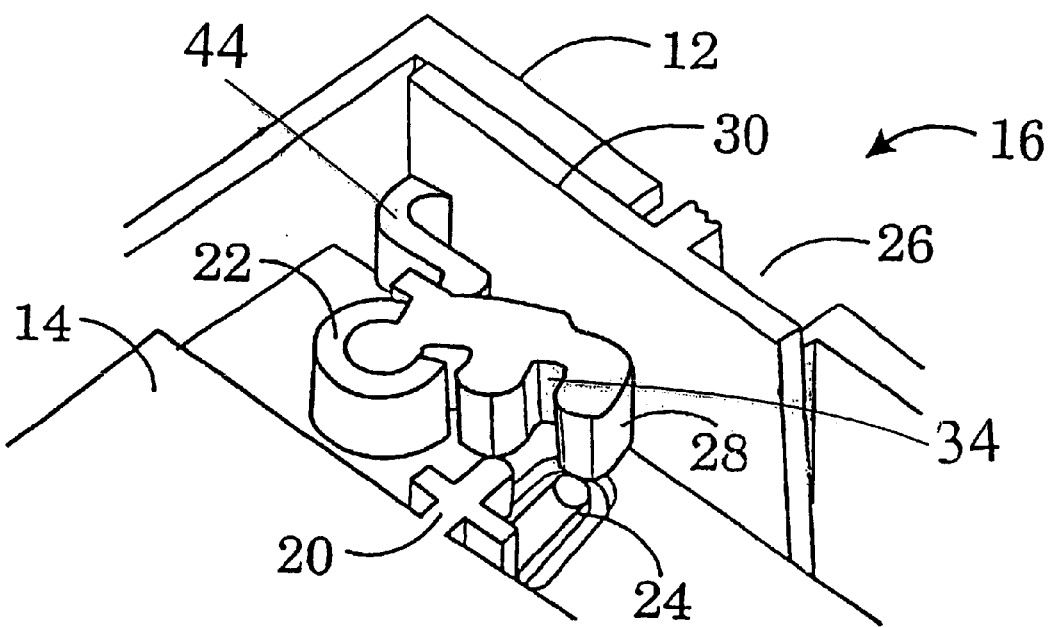
FIG. 1 shows a conventional locking apparatus of a scanner.
Figure 3:
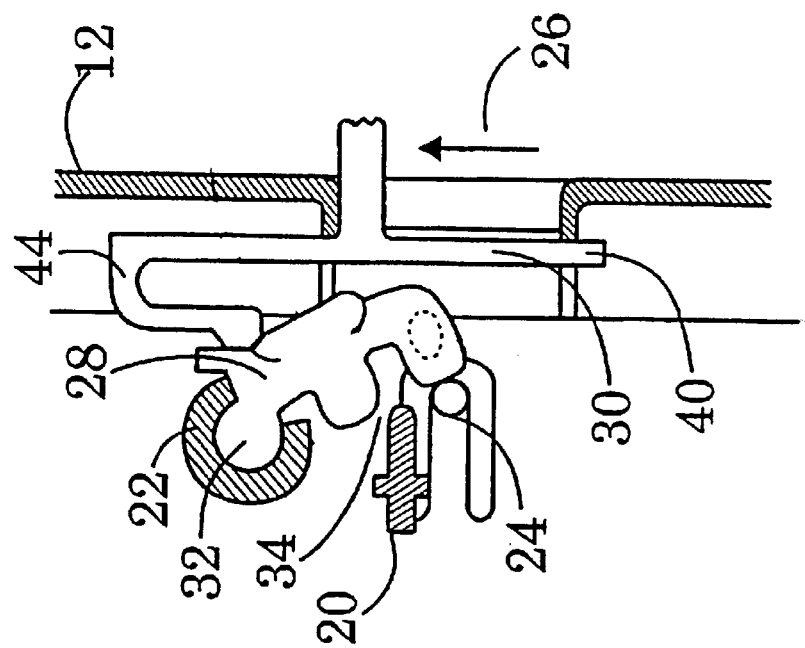
FIG. 3 shows the unlock state of the locking apparatus of a conventional locking apparatus of a scanner.
Figure 2:
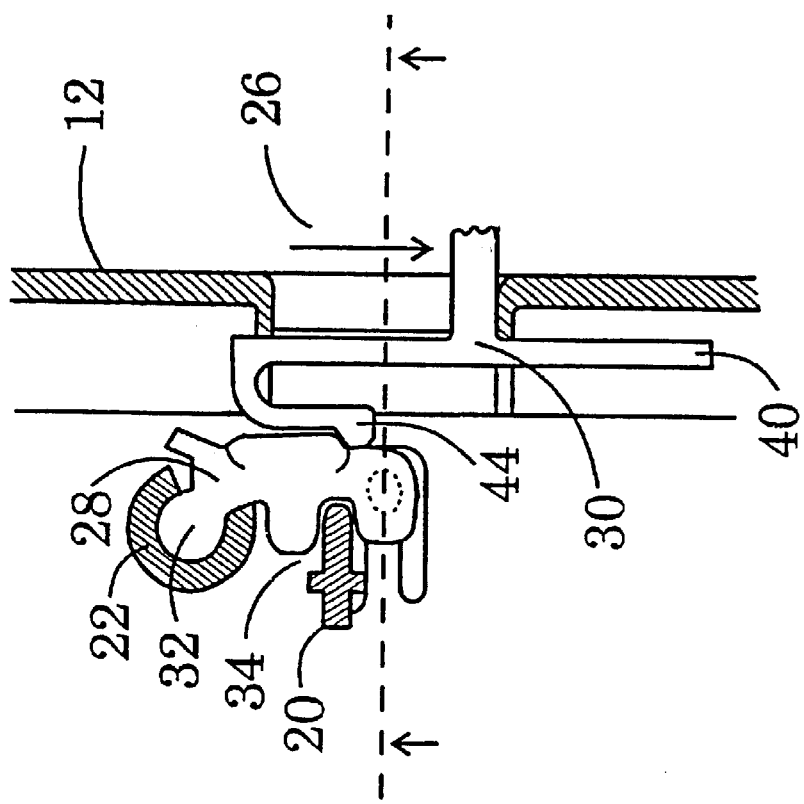
FIG. 2 shows the lock state of the locking apparatus device of a conventional locking apparatus of a scanner.
Figure 4:
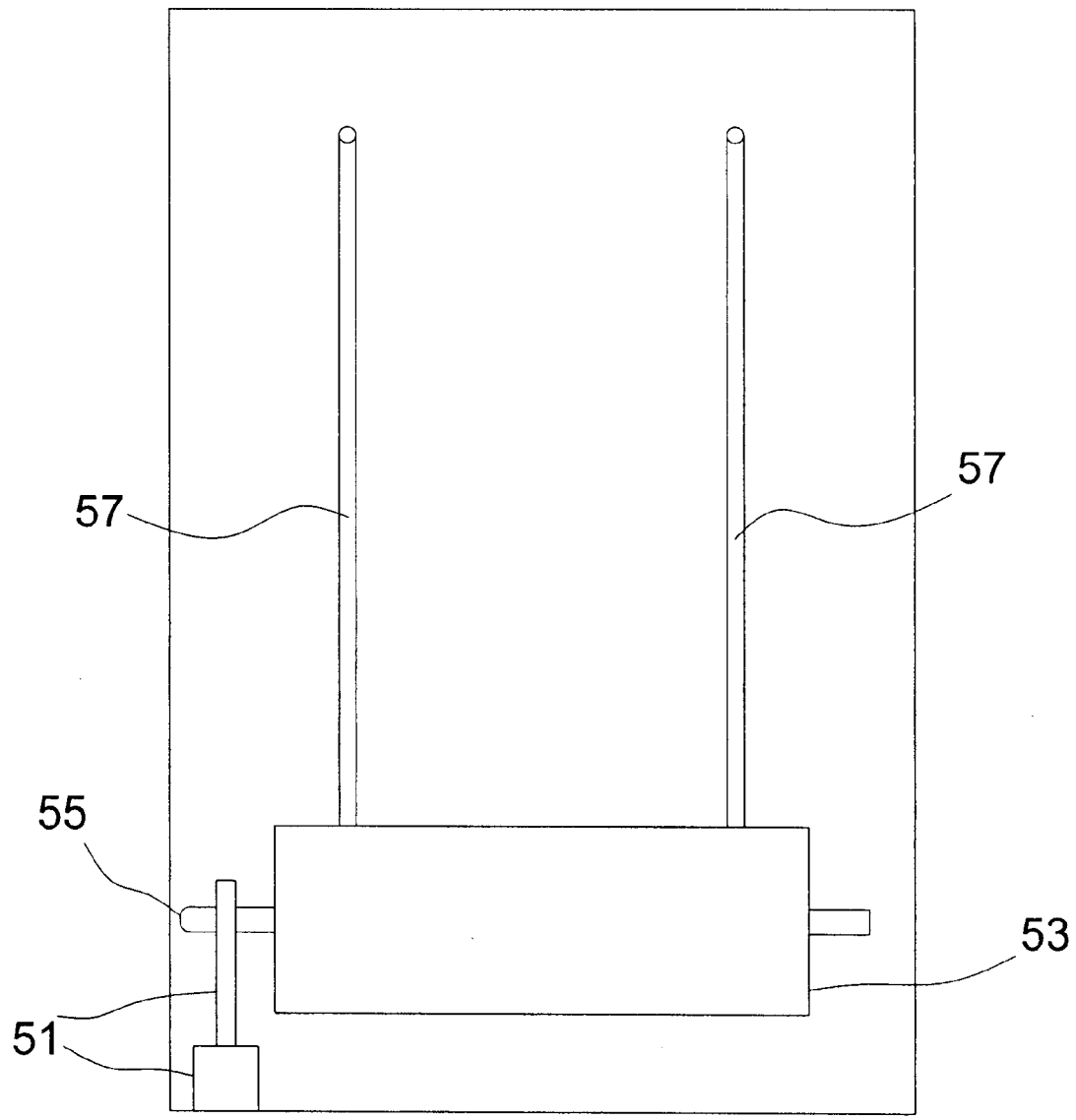
FIG. 4 shows a scanner applying the locking apparatus of the present invention.

As shown in FIG. 4, the present invention provides a locking apparatus for switching between a lock state and an unlock state of a sliding device 53 in a system 4. The system 4 has a plug 59 and a socket 61(not shown). The sliding device 53 slides on a sliding rail 57 and has a shaft 55.

Figure 5:
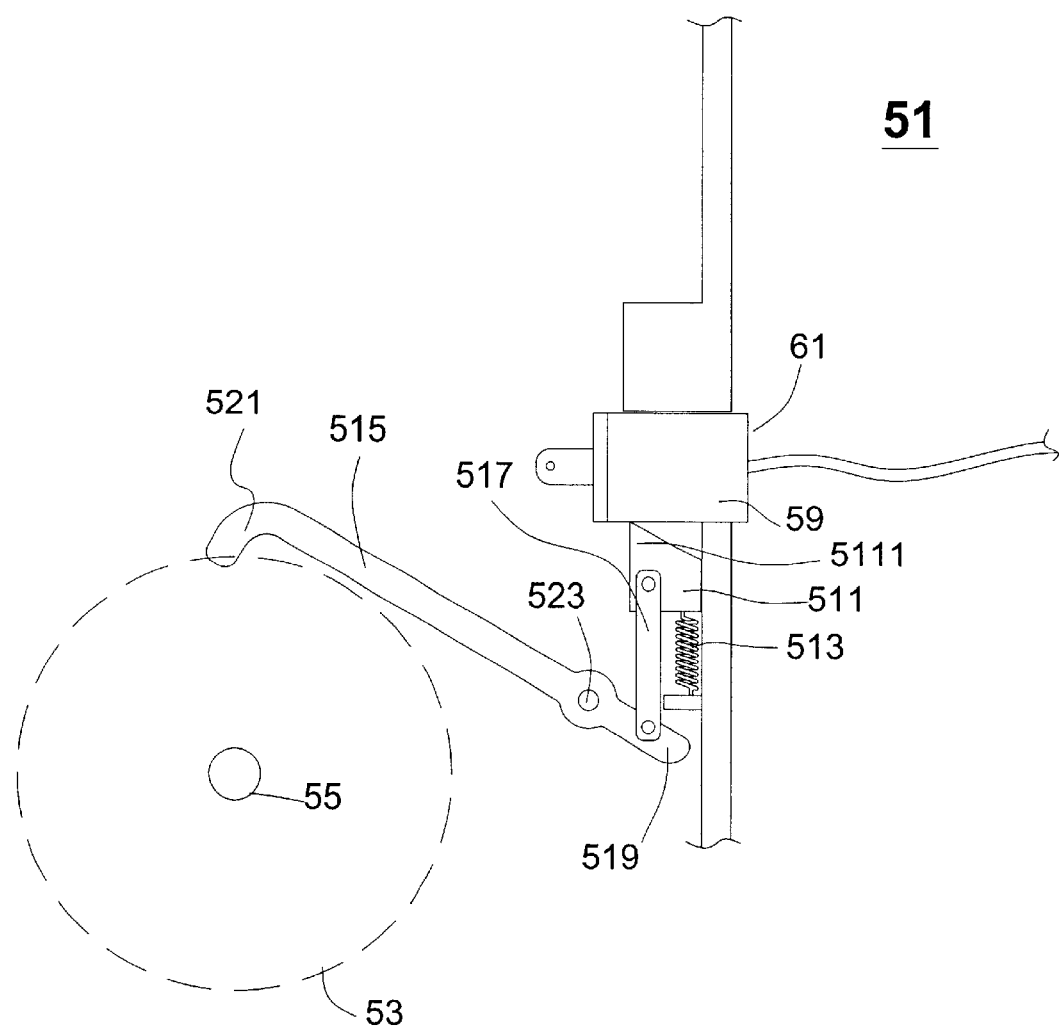
FIG. 5 shows the locking state of the locking apparatus of the present invention.

As shown in FIG. 5, the locking apparatus 51 includes a sliding member 511, a spring 513, a hook 515, and a connecting member 517. The sliding member 511 is movably disposed within the socket 61. The spring 513 is coupled to the sliding member 511. The hook 515 includes an end part 519 and a bending portion 521 for locking the shaft 55. The connecting member 517 is respectively coupled to the sliding member 511 and the end part 519.

In addition, the sliding member 511 has a protrusion 5111 exposed within the socket 61. When the plug 59 is plugged into the socket 61 and touches the protrusion 5111, the sliding member 511 downwardly moves. When downwardly moving, the sliding member 511 drives the connecting member 517 to downwardly push the end part 519.

Further, the hook 515 includes a pivot 523 allowing the end part 519 and the bending portion 521 to be driven respectively downward/upward and upward/downward like a seesaw.

As shown in FIG. 5, the plug 59 is plugged into the socket 61 and downwardly pushes the sliding member 511 allowing the connecting member 517 to move downwardly and the bending portion 521 to move upwardly. The shaft 55 is then unlocked, allowing the sliding device 53 to move on the sliding rail 57.

Figure 6:
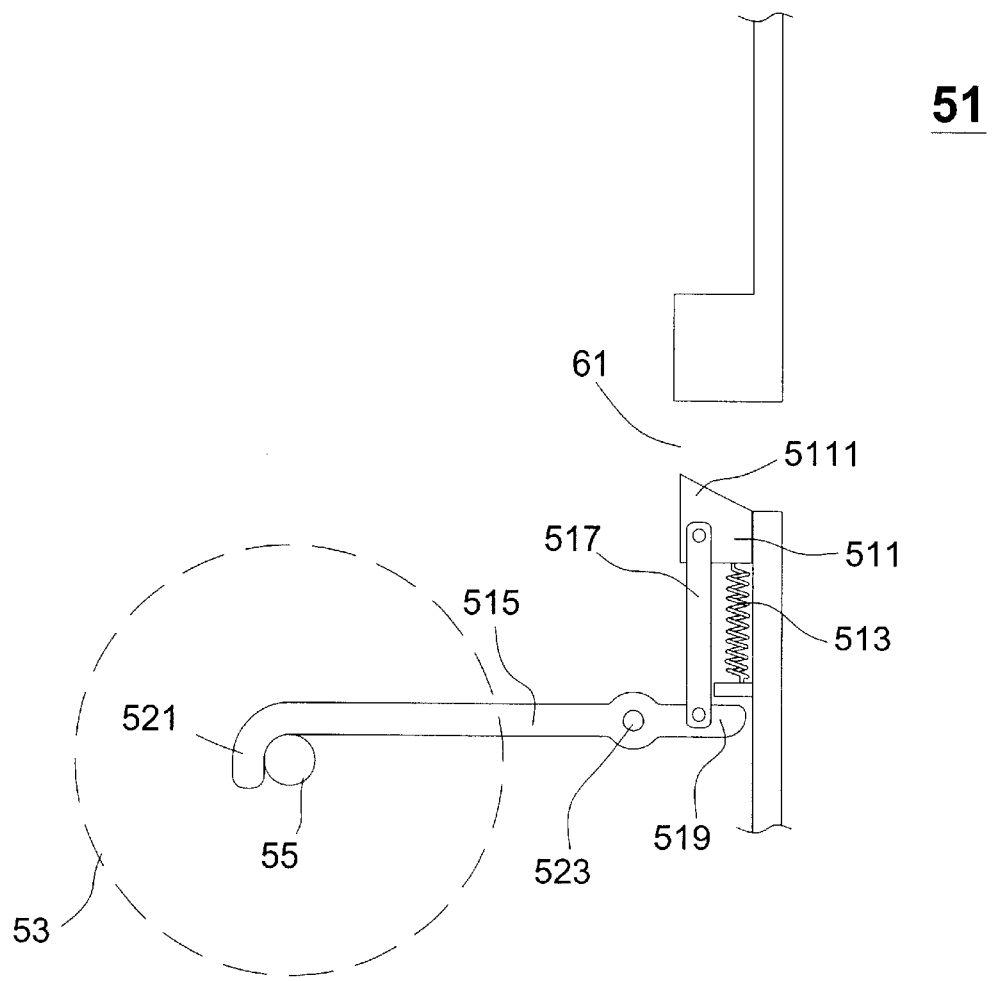
FIG. 6 shows the unlocking state of the locking apparatus of the present invention.

On the other hand, as shown in FIG. 6, the sliding member 511 is driven upwardly by the bounce of the spring 513 when the plug 59 is pulled out from the socket 61. The connecting member 517 further moves upwardly to indirectly drive the bending portion 521 to move downwardly. The shaft 55 is then locked and so is the sliding device 53.

In the embodiment, the socket 61 may be a power cable or a data signal cable, which is not intended to be construed in a limiting sense. Any similar sockets fall within the true scope of the invention. In addition, the system 4 is a scanner and the sliding device is a carriage when the present invention is applied to a scanner. However, this is not the only application of the present invention. Any sliding devices in similar systems may use the present invention to achieve the purpose of locking.

Before moving a scanner, users have to pull out the power cable or the data signal cable, so as to lock the locking apparatus of the present invention. Before using the scanner, the user has to plug the plug into a power cable socket or a data signal cable socket. Meanwhile, the locking apparatus of the present invention is in an unlock state. In other words, with the plug of the power cable or data signal cable plugged or unplugged, the locking apparatus 51 is automatically locked or unlocked without additional actuation steps. Therefore, the present invention efficiently avoids the possible damage and inconvenience caused by the users' forgetfulness or carelessness.

Although the invention has been shown and described with respect to the embodiments, it will be understood by those skilled in the art that various changes and modifications may be made without departing from the spirit and scope of the invention as defined in the following claims.

What is claimed is:

1. A locking apparatus for switching between a lock state and an unlock state of a sliding device in a system, said system including a plug and a socket, said sliding device including a shaft, said locking apparatus comprising:
   a sliding member movably disposed within said socket;
   a spring coupled to said sliding member;
   a hook, including an end part and a bending portion, for locking said shaft; and
   a connecting member for respectively coupled to said sliding member and said end part;
   wherein as said plug is plugged into said socket, said locking apparatus unlocks said shaft, and, as said plug is pulled out from said socket, said locking apparatus locks said shaft.

2. The locking apparatus of claim 1, wherein when said plug is plugged into said socket, said sliding member is pressed down against said connecting member to raise said bending portion for unlocking said shaft.

3. The locking apparatus of claim 1, wherein when said plug is pulled out from said socket, said sliding member is pressed up by a force applied from said spring, said connecting member is upwardly driven to lower said bending portion for locking said shaft.

4. The locking apparatus of claim 1, wherein said hook further comprising:
   a pivot allowing said end part to move downwardly when said bending portion is upwardly driven, and allowing said end part moves upwardly when said bending portion is downwardly driven.

5. The locking apparatus of claim 1, wherein said sliding member includes a protrusion exposed within said socket, and in response to actuation of said plug, said sliding member downwardly moves.

6. The locking apparatus of claim 1, wherein said connecting member connects respectively to said sliding member and said end part by multiple screws.

7. The locking apparatus of claim 1, wherein said socket is a socket of a power cable.

8. The locking apparatus of claim 1, wherein said socket is a socket of a data signal cable.

9. The locking apparatus of claim 1, wherein said system is a scanning apparatus.

10. The locking apparatus of claim 1, wherein said sliding device is a carriage.

11. A scanning apparatus, comprising:
    a sliding device including a shaft;
    a plug;
    a socket for allowing said plug to put into selectively; and
    a locking device for switching between a lock state and an unlock state of said sliding device, comprising:
      a sliding member movably disposed within said socket;
      a spring coupled to said sliding member;
      a hook, including an end part and a bending portion, for locking said shaft; and
      a connecting member for respectively coupled to said sliding member and said end part;
    wherein as said plug is plugged into said socket, said locking apparatus unlocks said shaft, and, as said plug is pulled out from said socket, said locking apparatus locks said shaft.

12. The scanning apparatus of claim 11, wherein when said plug is plugged into said socket, said sliding member is pressed down against said connecting member to raise said bending portion for unlocking said shaft.

13. The scanning apparatus of claim 11, wherein when said plug is pulled out from said socket, said sliding member is pressed up by a force applied from said spring, said connecting member is upwardly driven to lower said bending portion for locking said shaft.

14. The scanning apparatus of claim 11, wherein said hook further comprising:
    a pivot allowing said end part to move downwardly when said bending portion is upwardly driven, and allowing said end part moves upwardly when said bending portion is downwardly driven.

15. The scanning apparatus of claim 11, wherein said sliding member includes a protrusion exposed within said socket, and in response to actuation of said plug, said sliding member downwardly moves.

16. The scanning apparatus of claim 11, wherein said connecting member connects respectively to said sliding member and said end part by multiple screws.

17. The scanning apparatus of claim 11, wherein said socket is a socket of a power cable.

18. The scanning apparatus of claim 11, wherein said socket is a socket of a data signal cable.

19. The scanning apparatus of claim 11, wherein said sliding device is a carriage.

* * * * *